May 31, 1960

F. H. SPEDDING ET AL 2,938,784

NUCLEAR FUEL COMPOSITION

Filed Jan. 9, 1946

Witnesses:
Herbert E. Metcalf
Walter S. Schlegel, Jr.

Inventors:
Frank H. Spedding
Harley A. Wilhelm
By
Robert A. Lavender
Attorney

May 31, 1960 F. H. SPEDDING ET AL 2,938,784
NUCLEAR FUEL COMPOSITION
Filed Jan. 9, 1946 4 Sheets-Sheet 4

Witnesses:
Herbert E. Metcalf
Walter L. Schlegel, Jr.

Inventors
Frank H. Spedding
Harley A. Wilhelm
By: Robert A. Saunders
Attorney 2,938,784
Patented May 31, 1960

2,938,784
NUCLEAR FUEL COMPOSITION

Frank H. Spedding and Harley A. Wilhelm, Ames, Iowa, assignors to the United States of America as represented by the United States Atomic Energy Commission Filed Jan. 9, 1946, Ser. No. 640,104

1 Claim. (Cl. 75—122.7)

The present invention relates to the general subject of nuclear fission and particularly to the establishment of a self-sustaining fast neutron chain fission reaction in a novel reactive composition.

Experiments by Hahn and Strassman, the results of which were published in January 1939, led to the conclusion that nuclear bombardment of natural uranium by slow neutrons causes explosion or fission of the nucleus, which splits into particles of smaller charge and mass with energy being released in the process. Later it was found that neutrons were emitted during the process and that the fission was principally confined to the uranium isotope $U^{235}$ present as about .71 percent of the natural uranium.

When it became known that the isotope $U^{235}$ in natural uranium could be split or fissioned by bombardment with thermal neutrons, i.e., neutrons at or near thermal equilibrium with the surrounding medium, many predictions were made as to the possibility of obtaining a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power could be made available if a self-sustaining system could be built.

In order to attain such a self-sustaining chain reaction in a system of practical size, the ratio of the number of neutrons produced in one generation by the fissions, to the original number of neutrons initiating the fissions, must be known to be greater than unity after all neutron losses are deducted, and this ratio is, of course, dependent upon the values of the number of neutrons produced per fission and the number lost in the chain without producing fission.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorbers, and the reproduction ratio must still be sufficiently greater than unity to permit the neutron density to rise exponentially with time in the system as built.

In a self-sustaining chain reaction of uranium with slow neutrons, as presently understood, $92^{238}$ is converted by neutron capture to the isotope $92^{239}$. The latter is converted by beta decay to $93^{239}$ and this $93^{239}$ in turn is converted by beta decay to plutonium ($94^{239}$ or $Pu^{239}$). Other isotopes of 93 and 94 may be formed in small quantities. By slow or thermal neutron capture, $92^{235}$ on the other hand, can undergo nuclear fission to release energy appearing as heat, gamma and beta radiation, together with the formation of fission fragments appearing as radioactive isotope of elements of lower mass numbers, and with the release of secondary neutrons.

A self-sustaining chain reaction has heretofore been realized in systems where the fast neutrons emitted by the fission of $U^{235}$ in natural uranium are slowed to thermal or near thermal energies by a material known as a neutron moderator before causing additional fissions in $U^{235}$. Certain of such devices, known as slow neutronic reactors, embody natural uranium disposed in an efficient neutron energy moderator such as heavy water ($D_2O$), beryllium, and graphite. This slow neutron reaction is fully described and claimed in the Fermi and Szilard application Serial No. 568,904, filed December 19, 1944, now Patent Number 2,978,659.

However, it has been found in accordance with the present invention that reactive materials other than natural uranium can be used to support a chain reaction and further, to produce a fissionable isotope during the reaction in much the same manner as $94^{239}$ is produced in a natural uranium reaction. One such reactive material is thorium metal having a sufficient amount of a thermally fissionable isotope alloyed therewith to cause the material when combined with a neutron moderator, to be able to support a chain reaction. Under these circumstances, thorium will absorb neutrons leading to the formation of $U^{233}$ in accordance with the following isotope conversion sequence:

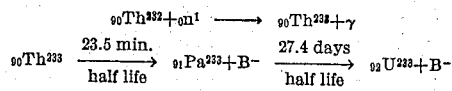

The thermally fissionable (fissionable by thermal neutrons) isotope to be incorporated in the thorium may be $U^{233}$, $U^{235}$, or $94^{239}$, or mixtures thereof; and the uranium isotopes are preferred, combined with the thorium as a uranium-thorium alloy. (As used herein, the term "thermally fissionable" means, as is common in the art, fissionable by thermal neutrons.) In certain instances a small amount of beryllium may also be incorporated in the alloy to increase workability and decrease the melting point of the alloy. This uranium-thorium alloy can then be used in conjunction with a suitable neutron moderator to produce a chain reaction in the same manner and in reactors of substantially the same type as those utilizing natural uranium.

It will be understood that the selection of moderator material, the relative positions of fissionable and moderator materials and the critical amounts and sizes of the reactive composition to produce a self-sustaining chain reaction are not in themselves the subject of this invention. Likewise the fact that such an element as thorium, which is not thermally fissionable may be converted to a thermally fissionable isotope by incorporation thereof in a neutronic reactor was known prior to the present invention, such elements or isotopes as thorium and $U^{238}$, both of which demonstrate this property, being designated as "fertile." The present invention, by employing alloys of fissionable and fertile materials as elements of the chain reactive composition, provides neutronic reactors and "fuel elements" therefor which may readily be substituted for natural uranium and for uranium enriched in the isotope $U^{235}$, the world supply of uranium, as is well known, being limited.

The objects and advantages of the present invention will be more readily understood by reference to the following specification and the accompanying drawings, wherein.

Figure 1:
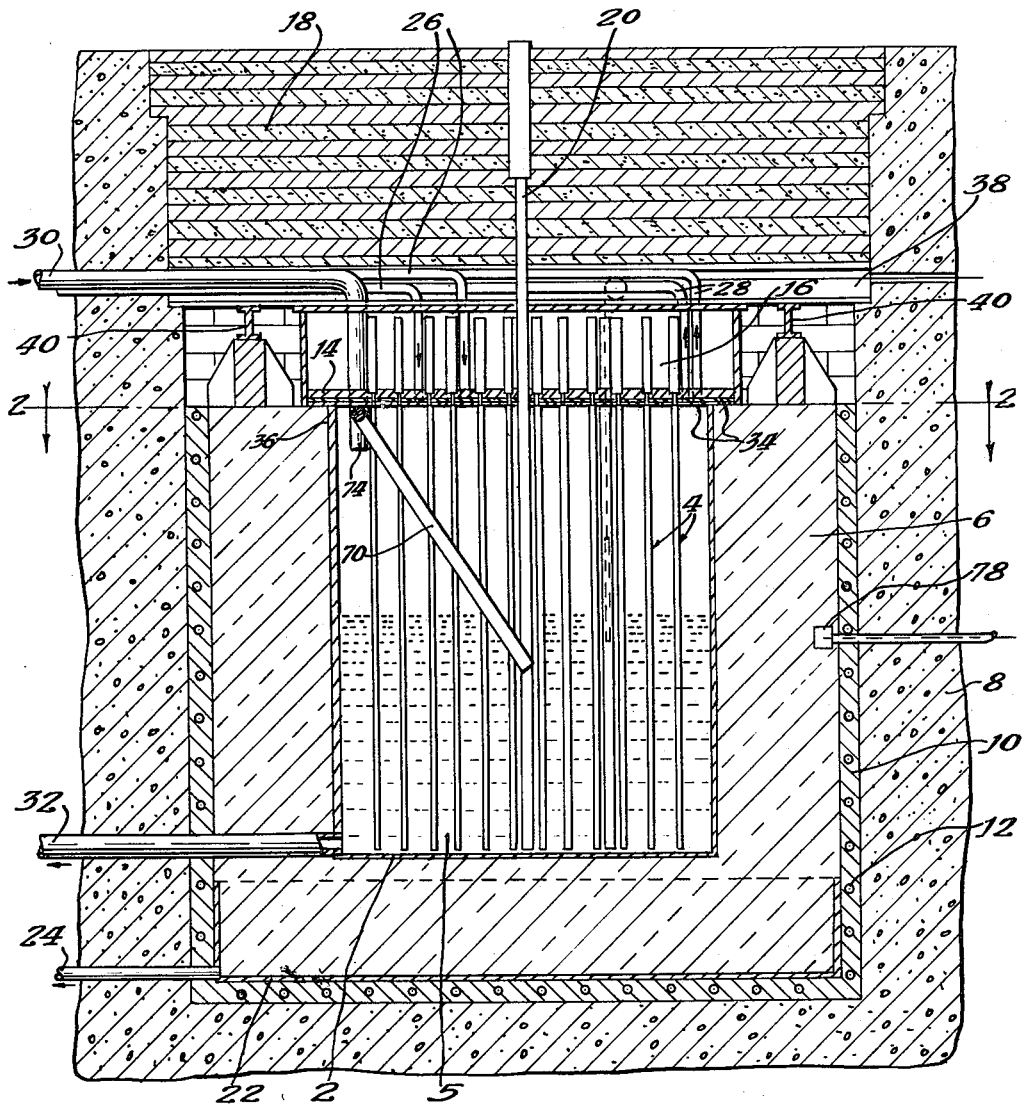
Fig. 1 is a vertical sectional view of a neutronic reactor embodying the invention.
Figure 2:
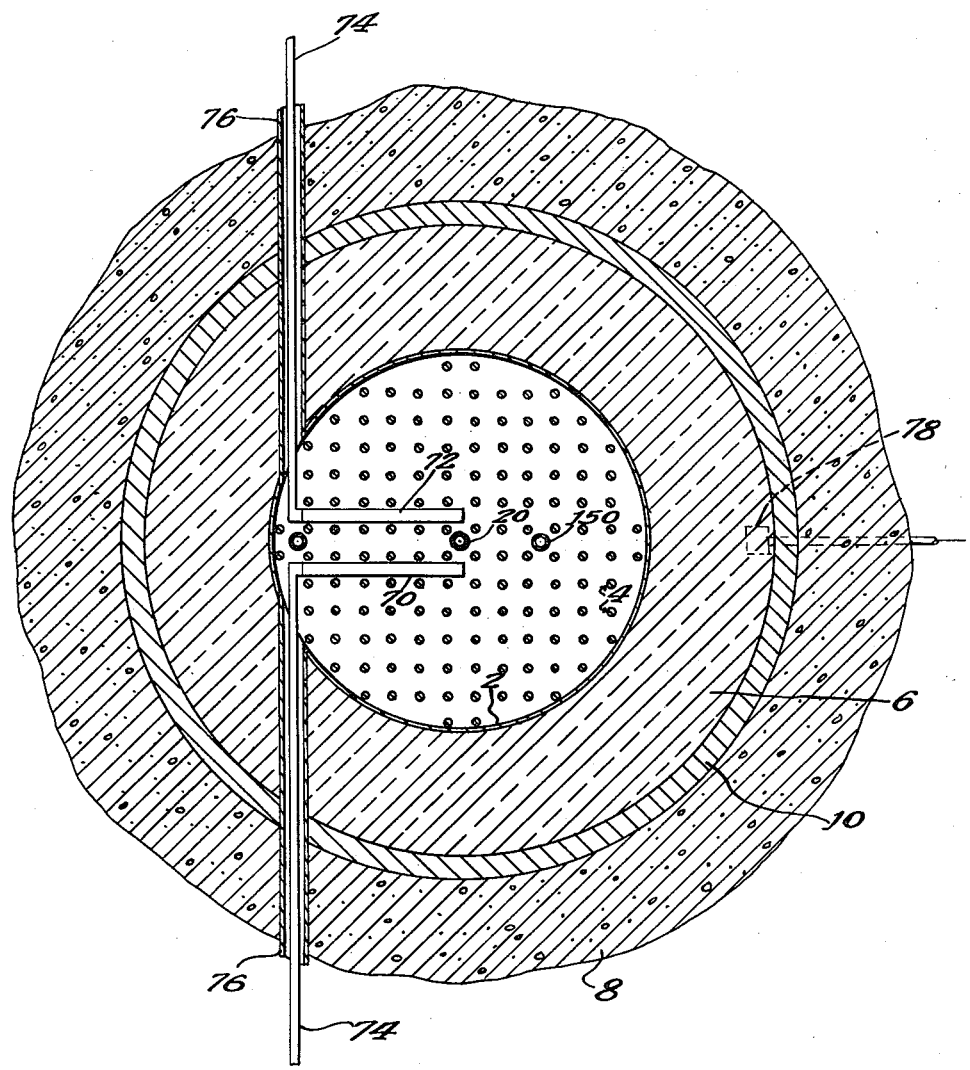
Fig. 2 is a horizontal sectional view, partially in elevation, taken on the line 2—2 of Fig. 1.
Figure 3:
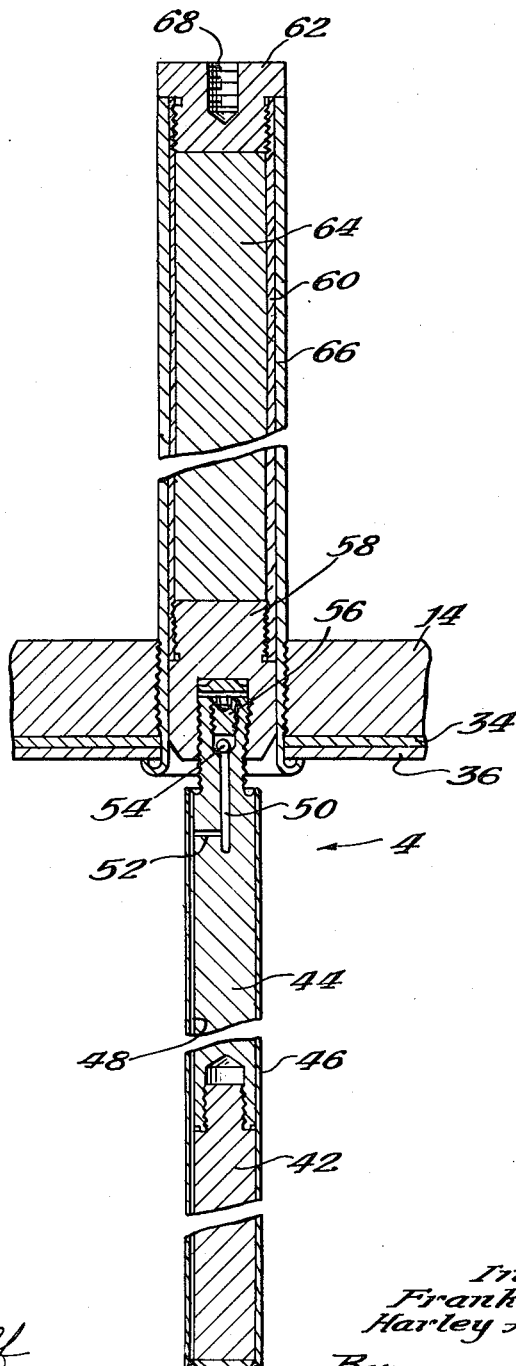
Fig. 3 is an enlarged fragmentary vertical sectional view through a portion of the reactor, showing in particular a reactive rod utilized in the arrangement of Figs. 1 and 2.

Describing the invention in detail and referring first to Figs. 1 to 3 inclusive, the numeral 2 denotes a neutronic reactor tank or container of cylindrical shape and of a material which is relatively noncorrodible at low temperatures and is relatively nonabsorbent with respect to neutrons such as, for example, aluminum or stainless steel. A suitable size of such tank for a self-sustaining chain reaction when $D_2O$ is used as a moderator is one that is 6 feet in diameter and 7 feet 4 inches high, although other sizes may also be used. Suspended in the tank 2 are 136 rods 4 of alloy metal 1.1 inches in diameter sheathed by aluminum about .035 inch in thickness to prevent extreme radioactivity and contamination of the $D_2O$ moderator by fission products emanating from the rods. The coating also prevents corrosion of the rods by the heavy water.

The rods 4 are hereinafter described in detail and extend to about ¼ inch from the tank bottom. Sufficient $D_2O$ indicated 5 is introduced into the tank 2 to obtain a volume of alloy metal and heavy water slightly over the critical size, which may be predicted well in advance of attainment thereof, as is more fully described in the abovementioned copending application.

Immediately surrounding the tank 2 is a neutron reflector 6 of moderator material such as, for example, graphite in the form of a cup within which the tank 2 is disposed. The reflector 6 and the tank 2 together with the tank's contents are referred to as the neutronic reactor. The moderator together with the alloy metal rods immersed therein constitutes what may be termed the active portion of the reactor. The thickness of the reflector 6 may be of the order of 2 or 3 feet or more, depending on the size of the active portion and the degree of neutron scattering or reflecting material, the overall size of the active portion of the reactor may be somewhat smaller than in an arrangement wherein no scattering layer is employed inasmuch as neutron losses from the periphery of the reactive portion are effectively reduced. Thus, the tank 2 and its contents may be constructed to a size slightly less than that which would be required to sustain a chain reaction without a reflector, so that the addition of the reflector 6 with its neutron reflecting action is effective to convert the reactor from one that is not capable of a sustained chain reaction to one that is so capable.

A concrete shield 8 surrounds the reflector 6 and serves to prevent neutrons and other radiations in harmful intensities from escaping to the outside of the structure, thereby avoiding hazard to operating personnel. This shield may be of the order of 5 to 10 feet in thickness. Interposed between the shield 8 and the reflector 6 is a cooled metal shield 10, preferably of a lead-cadmium alloy having cooling tubes 12 (Fig. 1) passing therethrough, a coolant such as ordinary water being circulated through the tubes 12. The shield 10 is especially adapted not only to cool the outside of the reactor but to minimize the escape of gamma and other penetrating radiations. The shield 12 is preferably at least 4 inches thick.

A cover plate 14 (Fig. 1), preferably formed of stainless steel, is provided at the top of the tank 2 and serves as a shield for absorbing thermal neutrons and also as a support for the rods 4 and control and safety rods pivotally mounted thereunder, as is hereinafter described. Above the plate 14 is a space or chamber 16 within which the upper ends of the rods 4 project and through which piping may be conducted. Above the space 16 is a shield 18, preferably composed of alternate layers of iron and masonite, said shield being adapted to absorb neutrons as well as other radiations from the tank 2.

A tube or well 20 of any suitable diameter, for example, 4 inches, extends through the shield 18, the chamber 16 and the cover plate 14 into the tank 2, said tube being preferably formed of a material, such as aluminum, having a low neutron capture cross section. It will be understood that objects may be introduced through the tube 20 into the center of the tank so that they may be bombarded by high intensity neutron radiations for the production of radioactive isotopes or for other desired purposes.

A pan 22 of stainless steel or other suitable material is located at the bottom of the reflector 6 for collecting any $D_2O$ that may leak from the tank 2, the heavy water being drained from the pan 22 by a drain pipe 24.

Helium at substantially atmospheric pressure is introduced through pipes 26 into the top of the reactor tank 2 at a point above the level of the $D_2O$ therein, the helffiium being withdrawn from the tank 2 by pipes 28. It will be understood that as the result of high neutron densities developed by the chain reaction within the tank 2 the $D_2O$ therein is decomposed into $D_2$ and $O_2$. These decomposition gases are collected at the top of the tank 2 and are swept therefrom by helium passing outwardly through the pipes 28. It may be noted that the helium is circulated through the pipes 26 and 28 by means of a conventional circulating system (not shown) comprising a conventional recombiner for recombining the $D_2$ and $O_2$ into $D_2O$ and for returning the latter to the tank 2. The helium may be circulated, for example, at the rate of 3 cubic feet per minute.

The chamber 16 also contains the $D_2O$ inlet pipe 30 through which $D_2O$ is supplied to the tank 2. A $D_2O$ outlet pipe 32 is provided at the bottom of the tank 2. If desired, the $D_2O$ can be circulated through external heat exchangers (not shown) connected to the pipes 30 and 32 and adapted to cool the moderator.

Immediately below the cover plate 14 is a cadmium shield 34 adapted to absorb slow neutrons emanating from the chain reaction and immediately below the cadmium sheet 34 is an aluminum sheet 36 which is primarily useful to prevent electrolytic action between dissimilar metals (cadmium and aluminum) within the tank 2.

The shield 18 is supported by two pairs of crossed I-beams 38 and 40, said beams having their extremities supported by the concrete shield 8.

Referring to Fig. 3, the numeral 4 denotes one of the composite alloy metal rods which is suspended in the $D_2O$ neutron moderator as shown in Fig. 1. The composite rod 4 comprises a cylindrical rod 42 of alloy metal, the composition of which is hereinafter discussed, said rod 42 being approximately 6 feet long and being screw threaded into a supporting rod 44 of non-fissioning material such as, for example, aluminum. A thin tubing 46 of aluminum is drawn over the alloy rod 42 and the supporting rod 44 by any well known drawing process, and thereafter, the joints formed at the top of the supporting member 44 and at the bottom of the rod 42 are welded so as to form an air-tight container around the rods 42 and 44 thereby protecting said rods from direct contact with the D₂O neutron moderator. A narrow longitudinal groove 48 is provided between the connected elements 42 and 44 and the tubing 46, and an axial groove 50 and a communicating radial groove 52 are provided at the top of the supporting rod 44, said grooves 52 communicating with the space 48 thereby making it possible to evacuate the air space and test for possible leaks in the top and bottom welded joints of the tubing 46 by noting the pressure interiorly of the air space 48 after a predetermined evacuation.

A ball valve 54 is provided to seal the space 50 from the atmosphere, and a closure plug 56 is provided within the top of the rod 44 for firmly seating the valve 54. A shank 58 is screwed on the top of the supporting rod 44, and an upwardly extending aluminum sleeve 60 is screwed on the shank 58 and is closed by an upper flanged member 62. A lead rod 64 is positioned between the shank 58 and the member 62 for the purpose of absorbing gamma rays escaping axially of the rod 4. The flange of the member 62 is supported on the top of a tube 66 screwed to the cover plate 14, and the member 62 is provided with an internal thread 68 by which the rod assembly can be attached to a lifting crane (not shown) for installation and removal.

The chain reaction may be prevented merely by inserting into the D₂O one or more rods such as hollow rods 70 and 72 (Fig. 2), each of said rods being approximately 4 inches in diameter and containing a 1/16 inch layer of cadmium sandwiched between aluminum walls. Each of the rods is pivotally supported by the cover plate 14 as hereinafter described. The rod 70 may be operated as a control or regulating rod, being immersed to a greater or less extent in the body of the D₂O as desired to control the neutron density within the system. The rod 72 may be considered as a safety rod which is normally held out of contact with the body of D₂O and is immersed therein only for emergency purposes, that is, when the rod 70 is insufficient to immediately stop the chain reaction. Each of the rods 70 and 72 is secured to a shaft 74 which is pivotally mounted within a sealed housing 76. Thus, by rotation of the shafts 74, the rods 70 and 72 may be actuated to any desired level within the tank 2.

Neutron density within the tank 2 is monitored by an ionization chamber 78, and the control rod 70 may be automatically actuated by control means (not shown) responsive to the neutron density within the system; or, if desired, the control rod 70 may be operated by manual actuating means (not shown) under the control of an operator who may monitor the neutron density by means of an indicator (not shown) connected to the ionization chamber 78.

The members 42 are preferably formed of a thorium-$U^{235}$ alloy, preferably containing a small quantity of beryllium which has been found to impart desirable characteristics of workability and low melting point to the alloy without appreciably affecting the neutron absorption characteristics thereof. Rods 42 formed of an alloy consisting of $U^{235}$ and beryllium of approximately 1.4 percent and .5 percent (by weight) respectively, and the balance substantially pure thorium have been found to have approximately the same characteristics in a neutronic reactor as neutronically pure natural uranium rods. It will be understood that other fissionable isotopes such as $U^{233}$ or $94^{239}$ may be substituted for $U^{235}$.

The above described alloy may be produced by mixing $UF_4$ and $ThF_4$ with Ca, the uranium in the $UF_4$ being preferably substantially pure $U^{235}$. $BeF_2$ is then quickly weighed out and mixed with the Ca—$UF_4$—$ThF_4$ mixture, inasmuch as $BeF_2$ is hygroscopic, and thus must not be exposed to air any longer than necessary. A suitable amount of a catalyst such as $I_2$ is then mixed with the whole charge, which is packed into an iron bomb lined with a sintered CaO crucible with loose lime packed between the crucible and the bomb. The bomb and its lining are preferably preheated to approximately 750° for one-half hour before using. Lime is packed on top of the charge and pressed leveled with the top of the bomb which is closed by a screw cap nearly filled with lime, said cap being screwed on the bomb and sealed with plumber's seal. The bomb is then heated in a furnace maintained at a temperature of approximately 850° until the charge ignites thus reducing the mixture to the Th—Be—$U^{235}$ alloy.

Thus it will be understood that the present invention comprehends a novel neutronically reactive composition capable of sustaining a chain reaction for an extremely long period of time without the necessity of replacing the rods 4, which are composed of an alloy of fissionable material and a fertile material (thorium) capable of undergoing nuclear reaction under neutron bombardment to produce more fissionable material ($U^{233}$). The production of fissionable material by neutron bombardment of the thorium atoms, as the original fissionable material within the alloy is destroyed by fissions, lengthens the life of the reactive composition and makes possible the maintenance of a chain reaction therein for a relatively long period of time without the necessity of replacing the alloy rods 4 at frequent intervals, as would be necessary if the fissionable isotope were alloyed with a metal incapable of producing fissionable material by nuclear reaction.

Figure 4:
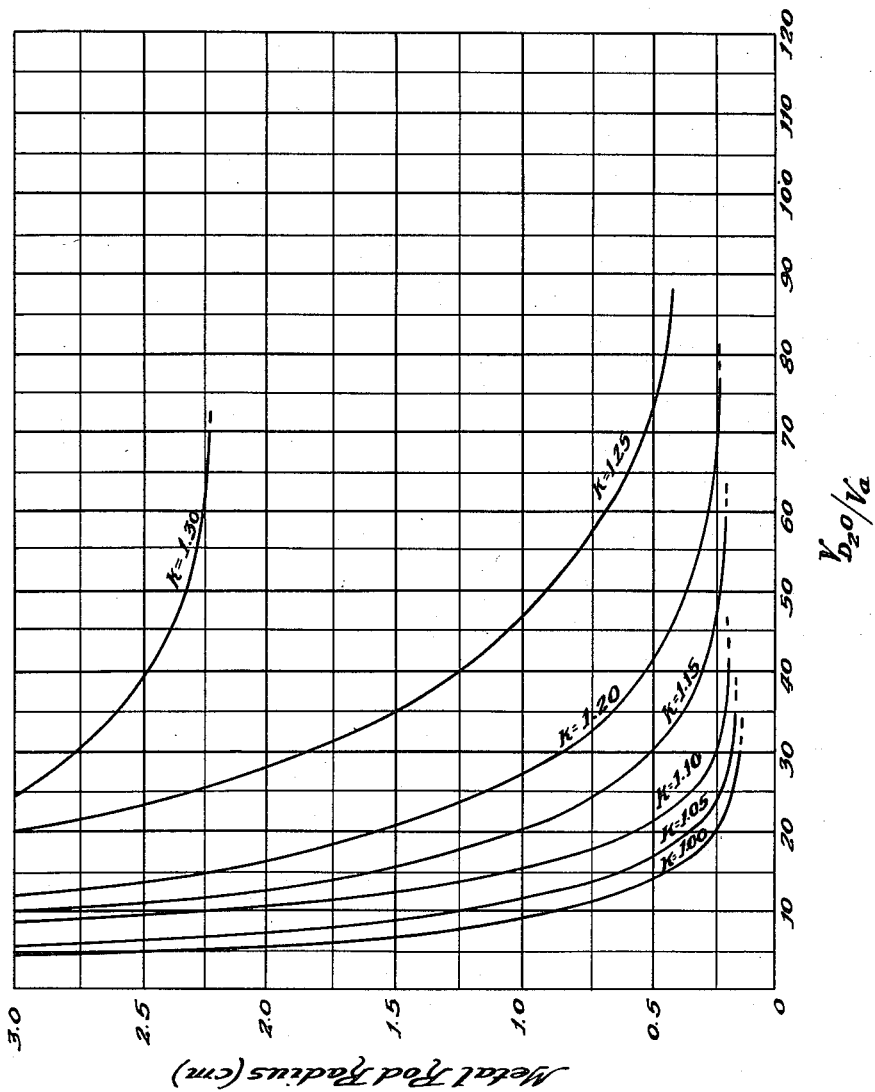
Fig. 4 is a graph showing K contour lines for reactive alloy metal rods immersed in $D_2O$ as shown in Figs. 1 and 2.

Referring now to Fig. 4, K curves are shown for reactors, such as above described, constructed of the above mentioned alloy rods in a D₂O moderator. The ordinates on the graph shown in Fig. 4 are given as rod radii and the abscissae as volume ratios of D₂O to the alloy. The curves clearly indicate that an optimum K constant of about 1.3 can be obtained with rods of about 2.5 cm. radius immersed in D₂O at a volume ratio of about 40 D₂O to 1 alloy. It will be understood that the range of volume ratios at which the K factors will be greater than unity is very wide and the upper limits of the curves are not presently well known; however, for optimum and near optimum arrangements at the lower volume ratios, the curves shown are sufficiently accurate for use in designing operative D₂O reactors such as that above described.

While the theory of nuclear fission chain reactions set forth herein is based on the best presently known experimental evidence, the invention is not limited thereto inasmuch as additional experimental data later discovered may modify the theory disclosed.

It is to be noted that while certain of the presently disclosed uranium-thorium-beryllium alloys and reactors constructed therewith are substantially equivalent to natural uranium in their neutronic characteristics, such alloys can be enriched with 10% or more of $U^{235}$ or other fissionable isotope to the point where, for example, a controllable fast neutron chain reaction can be obtained from the solid alloys without moderator, in a manner similar to that obtained by the use of solid enriched uranium, as described and claimed in copending application of Snell, Serial No. 621,843, filed October 11, 1945, now Patent No. 2,815,319, issued December 3, 1957.

It is also to be noted that when it is desirable to separate the uranium from the thorium for purification, for example, both the $U^{235}$ and $U^{233}$ formed are chemically separable together from the thorium. When separated, these mixed isotopes can be used to form new alloys as disclosed herein.

What is claimed is:

An alloy consisting essentially of thorium and uranium-235, said uranium-235 existing in amount of at least 1.4%.

References Cited in the file of this patent

UNITED STATES PATENTS

| | | |
|---|---|---|
| 2,291,865 | Bernstoff et al. | Aug. 4, 1942 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |

OTHER REFERENCES

Fermi et al.: "Artificial Radioactivity Produced by Neutron Bombardment," Proc. Royal Soc. (London), Series A, No. 868, vol. 149, pages 554–7, April 1935.

Seaborg et al.: "Nuclear Properties of Uranium-233; A New Fissionable Isotope of Uranium," MDDC–787, 1 page, dated Apr. 14, 1942, declassified Jan. 28, 1947, published by U.S. Atomic Energy Commission.

AECD–2434, "Preparation and Properties of Some Gold Alloys," Sept. 30, 1943, declassified Dec. 28, 1948, 6 pages.

Smyth: "A General Account of the Development of Methods of Using Atomic Energy for Military Purposes Under the Auspices of the U.S. Government," pages 22, 94–99 (1945). Supt. of Documents, Washington, D.C.

Kelly et al.: "Phy. Rev.," 73, 1135–9 (1948).